(12) United States Patent
Uchide

(10) Patent No.: US 6,556,594 B2
(45) Date of Patent: *Apr. 29, 2003

(54) DATA MULTIPLEXING APPARATUS, METHOD AND SYSTEM

(75) Inventor: Koichi Uchide, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,406

(22) Filed: Nov. 11, 1998

(65) Prior Publication Data

US 2003/0043854 A1 Mar. 6, 2003

(30) Foreign Application Priority Data

Nov. 13, 1997 (JP) .......................................... 09-311645

(51) Int. Cl.[7] .............................. H04J 3/02; H04L 12/54
(52) U.S. Cl. ...................................... 370/537; 370/428
(58) Field of Search ................................ 370/428, 537, 370/538, 473; 725/91, 92, 93, 94, 97

(56) References Cited

U.S. PATENT DOCUMENTS

| | | | | | |
|---|---|---|---|---|---|
| 5,555,244 | A | * | 9/1996 | Gupta et al. | 370/397 |
| 5,561,769 | A | * | 10/1996 | Kumar et al. | 370/255 |
| 5,666,365 | A | * | 9/1997 | Kostreski | 370/537 |
| 5,802,068 | A | * | 9/1998 | Kudo | 370/538 |
| 5,835,498 | A | * | 11/1998 | Kim et al. | 370/537 |
| 5,835,843 | A | * | 11/1998 | Haddad | 725/92 |

* cited by examiner

*Primary Examiner*—Wellington Chin
*Assistant Examiner*—William Schultz
(74) *Attorney, Agent, or Firm*—Frommer Lawrence & Haug LLP; William S. Frommer; Dennis M. Smid

(57) ABSTRACT

A data multiplexing apparatus, method, and system, generates scheduled data for instructing the reading and multiplexing of clips, sequentially reads from a storage unit, transport stream packets based on clips corresponding to the scheduled data, and uses a multiplexer to time-divisionally multiplex the transport stream packets read from the storage unit, which correspond to a plurality of channels, without separating them into data for the respective channels. Accordingly, a load on a host PC is reduced, and a system structure can be simplified.

5 Claims, 15 Drawing Sheets

FIG. 8

|      | t1  | t2  | t3  | t4  |
|------|-----|-----|-----|-----|
| CLP1 | 300 | 300 |     | 330 |
| CLP2 | 301 | 301 | 301 | 301 |
| CLP3 |     | 250 | 250 | 250 |
| N    | 2   | 3   | 2   | 3   |

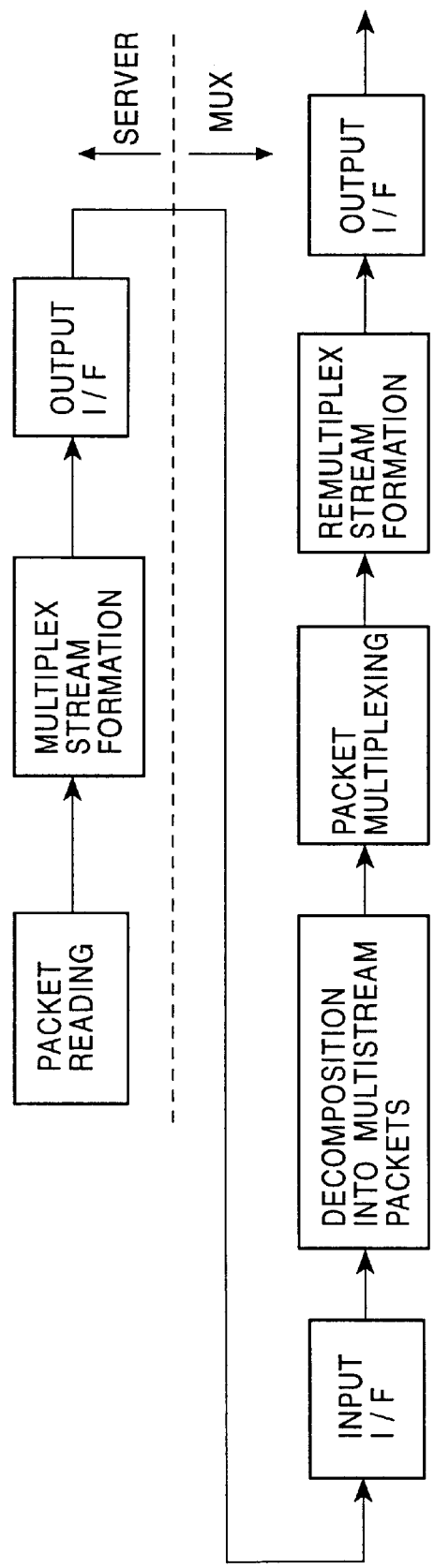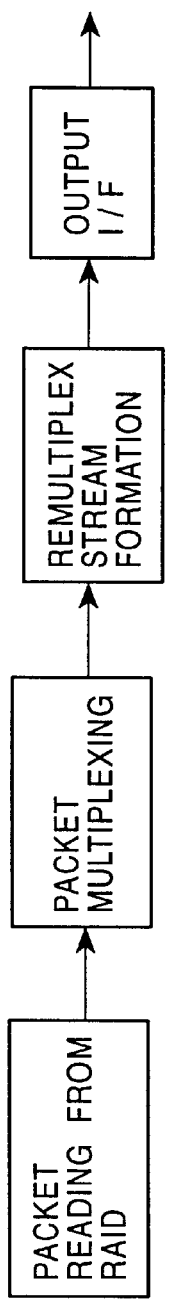
FIG. 14A
FIG. 14B

DATA MULTIPLEXING APPARATUS, METHOD AND SYSTEM

BACKGROUND OF THE INVENTION

1. Field of the Invention

The present invention relates to data multiplexing apparatuses, methods and systems, and can be applied to, for example, digital video-on-demand systems, and digital transmission systems such as community access television (CATV). The present invention sets scheduling in accordance with reading requests, and transmits data streams obtained by multiplexing materials (hereinafter referred to as "clips") stored in a server, whereby reducing a load on a host computer used for managing a system of this type.

2. Description of the Related Art

In conventional digital transmission systems such as CATV, with a videocassette recorder (VCR) or the like managed on a time base, video signals output from the VCR or the like are encoded and multiplexed before being transmitted.

In the system of this type, by storing encoded video data in a server before transmitting them, the system structure can be simplified, and time-shifted programs or the like can easily be transmitted. In such a case, conventional apparatuses are combined to constitute a simplified system as shown in FIG. 15.

In a digital transmission system 1, an encoder 2 generates transport streams by using, for example, the standard of the Moving Picture Experts Group (MPEG) 2 to encode clips that are recorded in a server 3, and outputs the transport streams to the server 3.

Under the control of a host personal computer (host PC) 4, the server 3 holds the transport streams output from the encoder 2 in units of packets, and outputs the transport streams in units of packets at a predetermined timing. In other words, the server 3 selectively reads a plurality of programs stored based on the transport streams in accordance with programs to be transmitted from the digital transmission system 1, and outputs clips read based on the transport streams corresponding to the plurality of programs. At this time, the server 3 sets a packet identification (PID), etc., which is instructed by the host PC 4 in the packets of each transport stream, whereby reforming and outputting each transport stream.

A multiplexer (MUX) 5 decomposes the transport streams transmitted from the server 3 into transport stream packets (hereinafter referred to as "TS packets"), and time-divisionally multiplexes the TS packets. At this time, under the control of the host PC 4, the multiplexer 5 time-divisionally multiplexes transport streams (normally, four to six transport streams) for predetermined channels that are assigned to one frequency band obtained by performing frequency multiplexing, whereby outputting multiplexed streams based on a plurality of clips.

Interfaces (I/Fs) 6A to 6N output the multiplexed streams output from the multiplexer 5, to modulators (MODS) 7A to 7N.

The modulators 7A to 7N use, for example, quadrature amplitude modulation (hereinafter referred to as "64QAM") to digitally modulate the multiplexed streams input from the I/Fs 6A to 6N, and output RF signals as modulated results.

A head end (HE) 8 performs frequency multiplexing of the RF signals output from the respective modulators 7A to 7N, and transmits the frequency-multiplex signal to a transmission link such as a coaxial cable.

In each terminal, in accordance with selection by a user, a set-top box (STB) 9 selectively receives the desired RF signal from the frequency-multiplex signal transmitted from the HE 8. The STB 9 demodulates the received RF signal to select the desired transport streams, and demodulates the original video signal, etc., based on the transport streams. Accordingly, in the digital transmission system 1, the desired programs can be viewed on monitors 10, and by transmitting the programs via the server 3, such a simplified structure can enhance usability.

In the case where the server 3 and the multiplexer 5 are independently provided using a combination of conventional devices as described above, as the number of output channels from the server 3 increases, the amount of processing by the multiplexer 5 increases. This increases a load on the host PC 4 managing the server 3 and the multiplexer 5. In addition, the number of devices constituting the entire system increases to complicate the system structure.

SUMMARY OF THE INVENTION

Accordingly, it is an object of the present invention to provide a data multiplexing apparatus, a data multiplexing method, and a data multiplexing system in which a load on a host PC can be reduced.

To this end, according to a first aspect of the present invention, the foregoing object has been achieved through provision of a data multiplexing apparatus comprising: scheduling means for generating scheduled data for instructing the reading and multiplexing of clips; reading means for sequentially reading, from storage means containing the clips, transport stream packets based on clips corresponding to the scheduled data; multiplexing means for time-divisionally multiplexing transport stream packets output from the reading means in accordance with the scheduled data; and data transmission means for transmitting data output from the multiplexing means; wherein the transport stream packets read from the storage means, which correspond to a plurality of channels, are time-divisionally multiplexed without being separated into data for the respective channels.

Preferably, the scheduling means updates the scheduled data in accordance with a request input at a predetermined timing.

The data transmission means may include digital modulation means for digitally modulating the data output from the multiplexing means, and outputting the digitally modulated data.

According to a second aspect of the present invention, the foregoing object has been achieved through provision of a data multiplexing method comprising the steps of: generating scheduled data used for instructing the reading and multiplexing of clips; sequentially reading, from storage means containing the clips, transport stream packets based on clips corresponding to the scheduled data; and time-divisionally multiplexing the transport stream packets output from the reading means in accordance with the scheduled data, and transmitting the time-divisionally multiplexed transport stream packets; wherein in the step of time-divisionally multiplexing the transport stream packets output from the reading means, which correspond to a plurality of channels, the transport stream packets are time-divisionally multiplexed without being separated into data for the respective channels.

Preferably, in the data multiplexing method, the scheduled data are updated in accordance with a request input at a predetermined timing.

According to the present invention, by time-sequentially generating scheduled data for instructing the reading and multiplexing of clips in accordance with transmission requests, using the scheduled data to read stored clips, and multiplexing the read clips, unified control of components constituting a system of this type can be performed, whereby a load on a host PC can be reduced. In addition, read transport stream packets are directly multiplexed between corresponding clips, whereby the entire system structure can be simplified.

BRIEF DESCRIPTION OF THE DRAWINGS

FIG. 8 is a table illustrating the setting of variables used in the process shown in FIG. 6.

FIG. 14 is a block diagram illustrating packet processing in the server shown in FIG. 2 in comparison with that by a combination of general-purpose apparatuses.

DESCRIPTION OF THE PREFERRED EMBODIMENTS

Embodiments of the present invention will be described below with reference to the attached drawings.

(1) First Embodiment (1-1) Overall Structure

Figure 1:
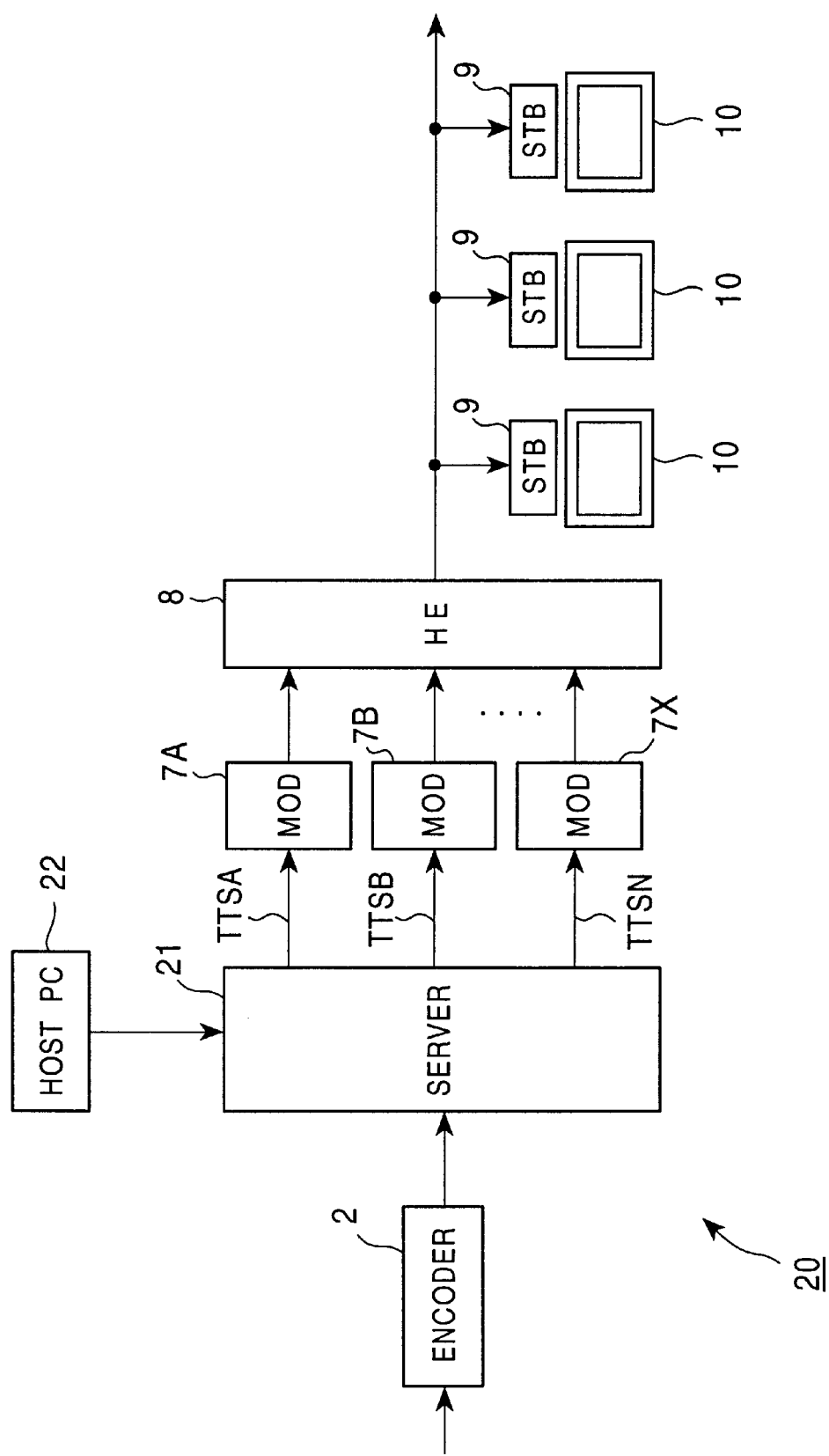
FIG. 1 is a block diagram showing a digital transmission system according to a first embodiment of the present invention.
Figure 15:
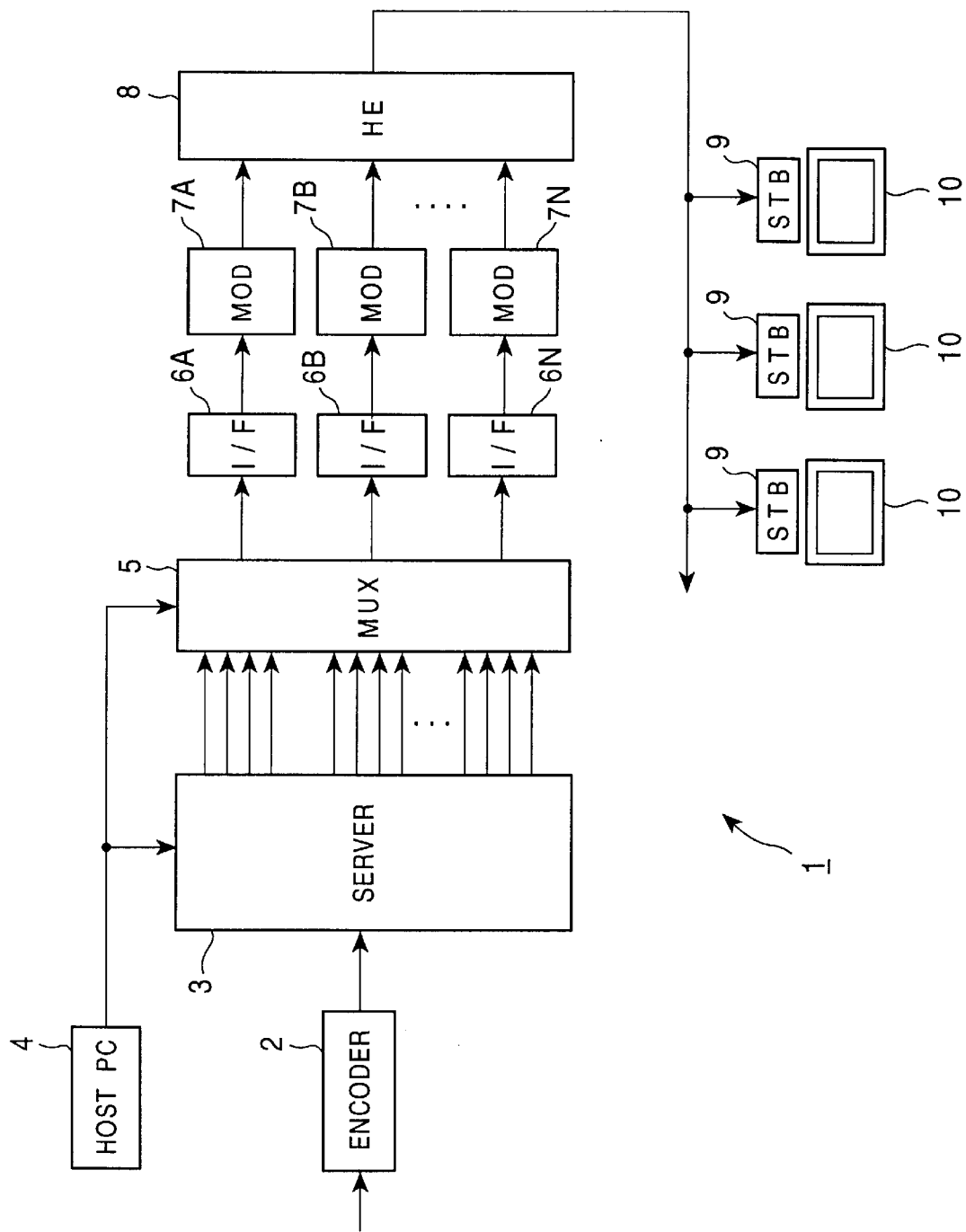
FIG. 15 is a block diagram showing a possible digital transmission system in the case where general-purpose apparatuses are combined.

FIG. 1 shows a block diagram of a digital transmission system 20 according to a first embodiment of the present invention. In the digital transmission system 20, a server 21 transmits multiplexed streams TTSA to TTSN obtained by multiplexing transport streams. Blocks identical to those shown in FIG. 15 are denoted by identical reference numerals, and a repetition of the description thereof is omitted.

The server 21 is controlled by a host PC 22 to store transport streams output from an encoder 2 in units of packets, whereby the clips desired by an operator are recorded. In response to a transmission request from the server 21, the server 21 reads the stored clips in units of packets to form and transmit the multiplexed streams TTSA to TTSN to modulators (MODs) 7A to 7N, respectively. The MODs 7A to 7N use 64 QAM to modulate the multiplexed streams TTSA to TTSN. The frequency multiplexing of the modulated multiplexed streams is performed by a HE 8, and the frequency-multiplexed signal is transmitted.

(1-2) Server 21

Figure 2:
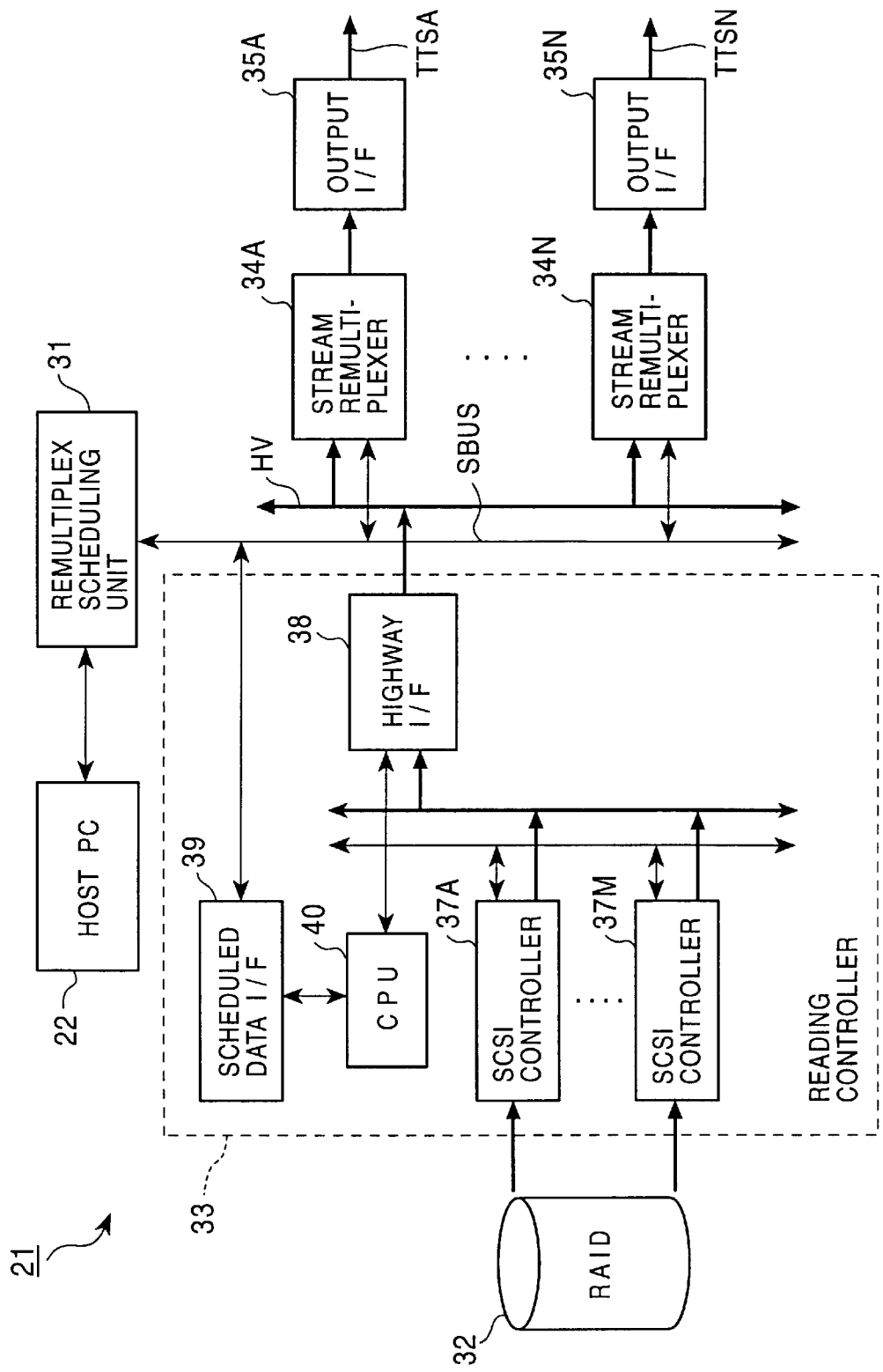
FIG. 2 is a block diagram showing the server shown in FIG. 1.

FIG. 2 shows a detailed block diagram of the server 21. In the server 21, a remultiplex scheduling unit 31 uses communications with the host PC 22 to control the overall operation of the server 21. In this control, the remultiplex scheduling unit 31 schedules a process for transmitting clips in accordance with a transmission request from the host PC 22, and generates scheduled data.

Figure 3:
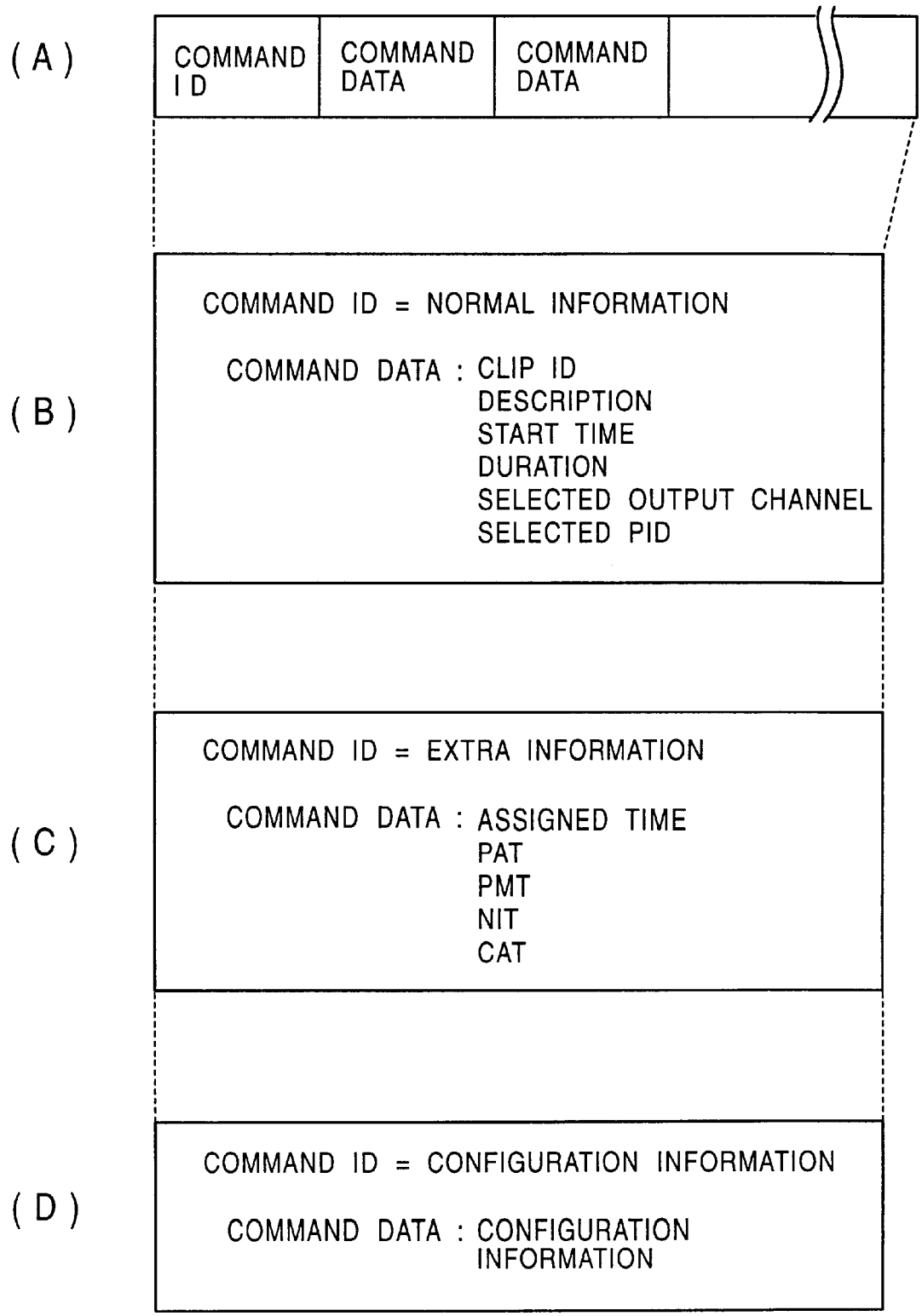
FIG. 3 is a drawing showing commands from a host PC.

At this time, from the host PC 22 to the remultiplex scheduling unit 31, various commands are input in the formats shown in FIG. 3. A control command includes a command identification (command ID) representing the contents of the control command, and command data necessary for executing the command ID, as shown in FIG. 3(A).

As shown in FIG. 3(B), for normal information representing the transmission of each clip, subsequent to the command ID, to which the normal information is assigned, a clip ID, a description, a start time, duration, a selected output channel, a selected packet identification (selected PID), etc., are assigned to the command data.

The clip ID is the ID of a clip recorded in the server 21. The description is a field representing the contents of the clip. The start time is a field used for setting a time at which the transmission of the clip starts. A scheduled data for transmitting a clip having the selected clip ID at the start time is generated by the remultiplex scheduling unit 31.

The duration is a field representing the length of the clip. The selected output channel is a field for setting an output channel for the selected clip. In the digital transmission system 1, from the channel set by the selected output channel, the corresponding clip is output.

The selected PID is a field for setting the PID of a transport stream constituting the clip. The first embodiment provisionally sets the PID of each transport stream by the encoder 2, and resets the provisionally set PID to the value set in the selected PID, whereby the double setting of PIDs is avoided in transmission of clips, and each transport stream can be managed by the host PC 22.

In addition, as shown in FIG. 3(C), in the case of extra information for setting information of various types to be added in the transmission of each clip, subsequent to the command ID, to which the extra information is assigned, a plurality of command data based on an operating standard of the (Japanese) Association of Radio Industries and Businesses (ARIB), such as an assigned time, a program association table (PAT), a program map table (PMT), a network information table (NIT), and a conditional access table (CAT), are transmitted.

The PAT represents the PID of the PMT used for transmitting information about packets constituting each program. This makes it possible to retrieve a program assigned to one frequency band. The PMT represents, by each program number, each PID for images, sound, or additional data in each program.

The NIT represents physical information about a transmission link, such as frequency bands for transmission. The CAT represents a PID used for transmitting scramble information.

As shown in FIG. 3(D), in the case of configuration information composed of various initial setting information, subsequent to the command ID, which represents the configuration information, the contents of the configuration information are assigned to the command data, and the command data are transmitted.

Figure 4:
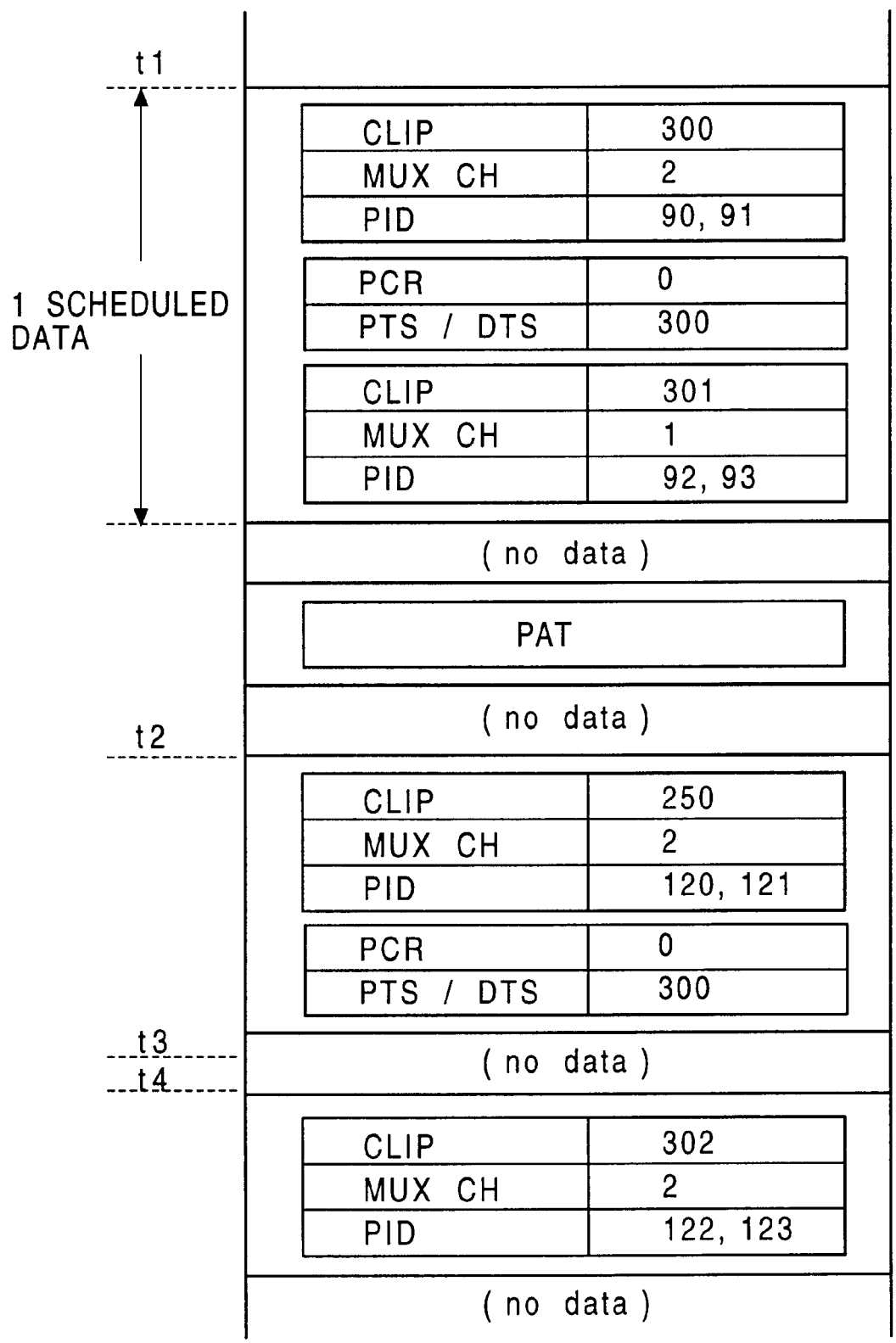
FIG. 4 is a drawing showing scheduled data.

In response to a transmission request input from the host PC 22, the remultiplex scheduling unit 31 generates scheduled data composed of clips to be sequentially transmitted, and information necessary for the transmission of the clips, at arbitrary timing, as shown in FIG. 4. The scheduled data use a time series to instruct the reading of the retained clips, multiplexing, and the output channel. When a plurality of clips are transmitted in the same time, the remultiplex scheduling unit 31 treats the plurality of scheduled data as one scheduled data. The remultiplex scheduling unit 31 also outputs the above-generated scheduled data to a scheduled data bus SBUS at the start of each transmission.

Figure 5:
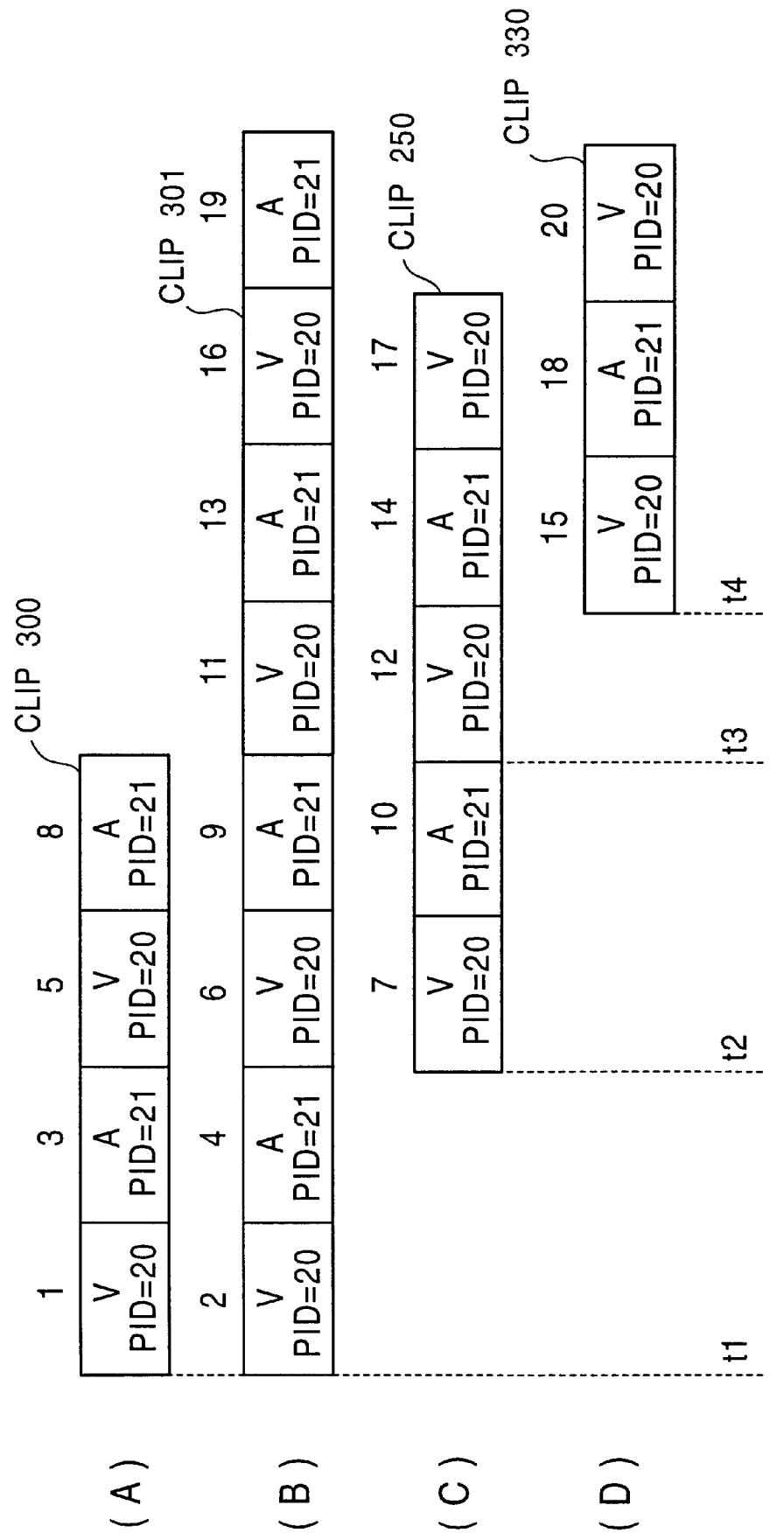
FIG. 5 is a time chart showing the reading of clips corresponding to the scheduled data shown in FIG. 4.

The scheduled data shown in FIG. 4 is a data array in the case where four clips 300, 301, 250 and 330, and a PAT transmission request as extra information are input as shown in FIG. 5. In the scheduled data shown in FIG. 4, the multiplex channels (MUX CH) correspond to selected output channels set in the normal information. The PIDs correspond to clip IDs set in the normal information.

Concerning the PAT, a PAT assigned to the extra information is assigned as is and is not modified. The presentation time stamp/decoding time stamp (PTS/DTS) corresponds to a PTS or DTS set by a PTS/DTS resetting unit described below.

A redundant array of inexpensive disks (RAID) 32 (shown in FIG. 2) stores the transport streams of the clips output from the encoder 2 in units of packets, and is controlled by the reading controller 33 to read and output the stored transport streams in units of packets.

The reading controller 33 reads the transport streams from the RAID 32 in accordance with the scheduled data, and outputs them to a stream highway HW.

The stream highway HW inputs the transport streams to corresponding stream remultiplexers 34A to 34N. The stream remultiplexers 34A to 34N multiplex and output the input transport streams.

Output interfaces (I/Fs) 35A to 35N output multiplexed data TTSA to TTSN output from the stream remultiplexers 34A to 34N, directly to modulators 7A to 7N.

(1-3) Reading Controller 33

In the reading controller 33, a small-computer-system-interface (SCSI) controller 37A to 37M control the operation of the RAID 32 in accordance with control commands output to a control bus, and read the transport streams recorded in the RAID 32 in units of packets before outputting them to a data bus.

The highway I/F 38 acquires and outputs the transport streams output to the data bus, to the stream highway HW.

A scheduled data I/F 39 acquires the scheduled data output from the remultiplex scheduling unit 31 to the scheduled data bus SBUS, and outputs the scheduled data to a central processing unit (CPU) 40.

The CPU 40 functions as a controller for controlling the operation of the reading unit 33. The CPU 40 executes the processes shown in FIGS. 6 and 7 in accordance with the scheduled data, whereby issuing control commands to the SCSI controllers 37A to 37M, and the transport streams recorded in the RAID 32 are transmitted to the stream highway HW in accordance with the scheduled data.

Figure 6:
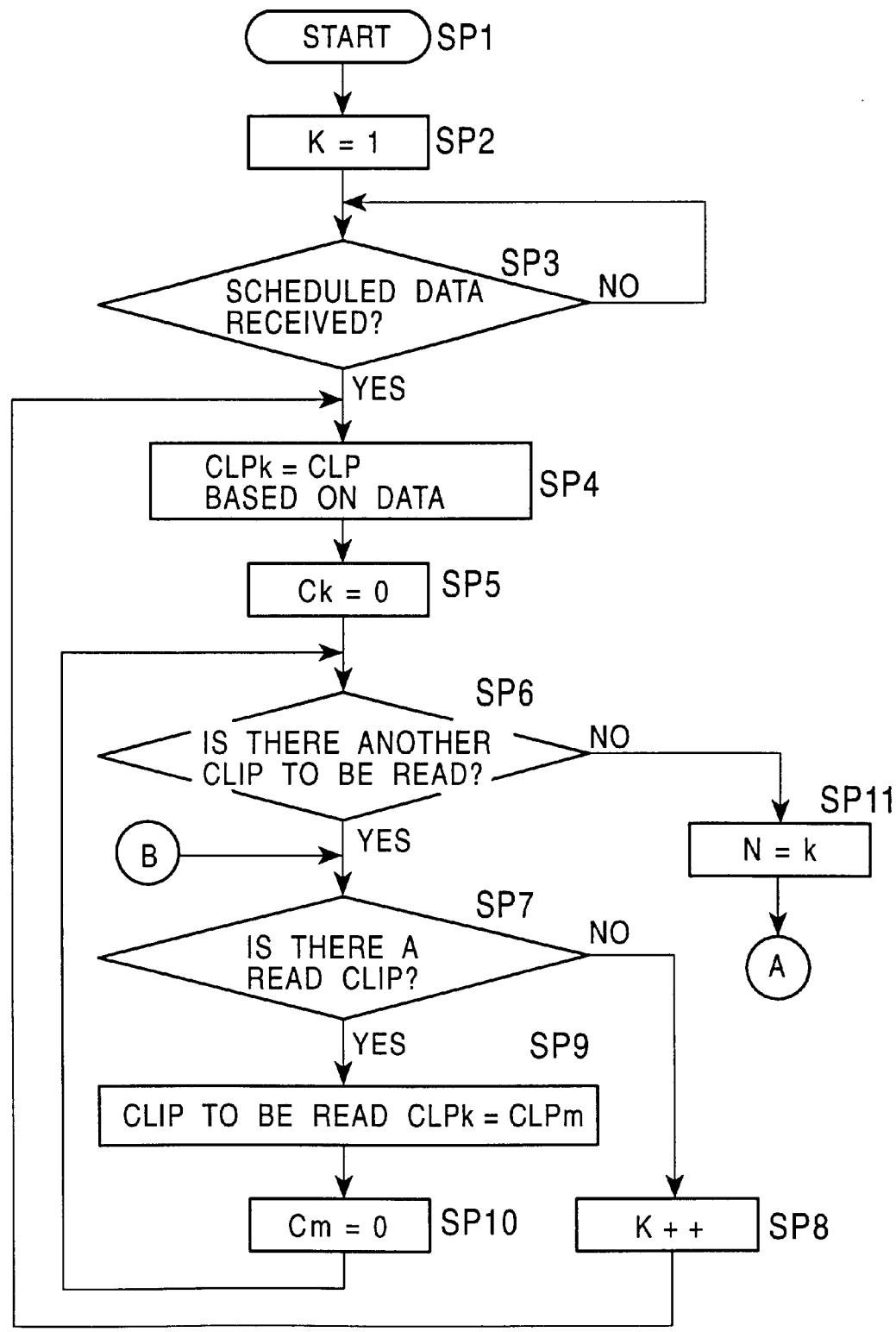
FIG. 6 is a flowchart showing a process performed by a central processing unit in a reading controller.
Figure 7:
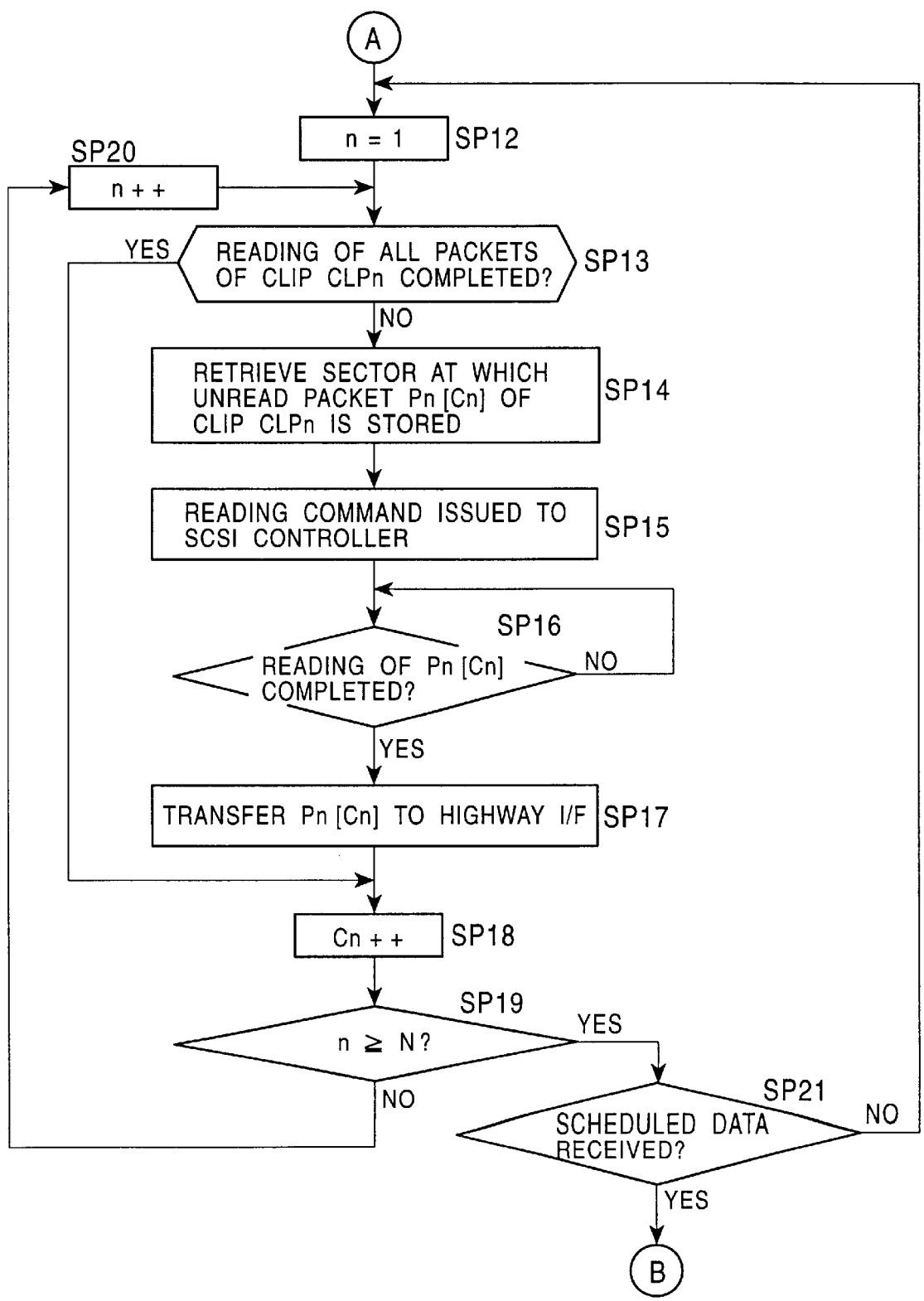
FIG. 7 is a flowchart showing a continuation of the flowchart shown in FIG. 6.

As shown in FIG. 6, the CPU 40 starts processing in step SP1. In step SP2, the CPU 40 sets at an initial value of 1, variable k used for recognizing a clip to be read. In step SP3, the CPU 40 determines whether the scheduled data has already been received. If the scheduled data has not been received, the CPU 40 remains on standby while repeatedly executing step SP3 until the scheduled data is received.

If the scheduled data has been received, in step SP4, the CPU 40 sets in the clip ID specified in the scheduled data, variable CLPk representing a clip to be read from the RAID 32. The clip ID is the ID of a clip retained in the RAID 32.

In step SP5, the CPU 40 sets variable Ck used for recognizing each TS packet in the clip to be read from the RAID 32, to an initial value of 0.

In step SP6, the CPU 40 determines, based on the scheduled data, that another clip must be read. If another clip must be read, in step SP7, the CPU 40 determines whether the RAID 32 has a read clip. If the RAID 32 has a read clip, in step SP8, the CPU 40 allows variable k to increment before returning to step SP4, in which it sets variable CLPk for another clip to be read, and in step SP5, it sets variable Ck to an initial value of 0 for this clip.

In this manner, the CPU 40 successively sets variables CLPk and Ck for each clip specified in the scheduled data.

In step SP7, if the CPU 40 has determined that the RAID 32 has a read clip, in step SP9, the CPU 40 assigns variable CLPk set for the read clip to a new clip (CLPm) to be read. The CPU 40 proceeds to step SP10, in which it sets variable Cm for the new clip to an initial value of 0.

When the successive setting of variables CLP and Cm is complete for each clip specified by the scheduled data, the CPU 40 has determined negatively in step SP6 (shown in FIG. 6), and proceeds to step SP11. In step SP11, the CPU 40 sets variable N representing the number of clips to be presently read. Accordingly, in the case where the CPU 40 transmits clips in the order described by referring to FIG. 5, it successively sets variables CLP1, CLP2, and CLP3, as shown in FIG. 8.

When the CPU 40 completes the variable setting based on the received scheduled data as described above, it proceeds to step SP12 (shown in FIG. 7). In step SP12, the CPU 40 sets variable n representing the number of clips to be read, to 1. In step SP13, the CPU 40 determines whether the reading of all TS packets Pn for the clip specified by variable CLPn is completed.

If the CPU 40 has determined negatively, it proceeds to step SP14, in which it retrieves from a file allocation table (FAT) a storage sector (address) containing TS packets Pn[Cn] being not read for the clip specified by variable CLPn.

In step SP15, the CPU 40 issues reading commands to the SCSI controllers 37A to 37M, based on the obtained storage sector containing TS packets Pn[Cn] being not read, before proceeding to step SP16. In step SP16, the CPU 40 determines whether the reading of packets Pn[Cn] ends. If it has determined negatively, it repeatedly performs step SP16.

Conversely, if the reading of packets Pn[Cn] ends, the CPU 40 proceeds to step SP17, in which it transfers the read packets Pn[Cn] to the highway I/F 38. In step SP18, the CPU 40 allows variable Pn[Cn] to increment before proceeding to step SP19. If, in step SP13, the CPU 40 has determined affirmatively, it directly proceeds to step SP18, in which it allows variable [Cn] to increment before proceeding to step SP19.

In step SP19, the CPU 40 determines whether variable n is not less than the number N of clips to be presently read. If the CPU 40 has determined negatively, it proceeds to step SP20, in which it allows variable n to increment before proceeding back to step SP13. In such a way, the CPU 40 repeatedly performs steps SP13, SP14, SP15, SP16, SP17, SP18, SP19, and SP20 so as to access transport streams to be presently broadcast, which are successively specified by scheduled data, whereby successively reading the packets of the transport streams from the RAID 32, and transmitting them.

When the transport streams to be presently broadcast are successively accessed for instructing the transmission of packets, one cycle of access causes the CPU 40 to determine affirmatively in step SP19, and proceeds to step SP21. In step SP21, the CPU 40 determines whether new scheduled data is received. If the CPU 40 has determined negatively, it proceeds to step SP12, in which it restarts successive access.

Conversely, if, in step SP21, the CPU 40 has determined that new scheduled data is received, it returns to step SP7 (shown in FIG. 6) in which it performs variable setting based on the received scheduled data before proceeding back to step SP12 for restarting.

(1-4) Stream Remultiplexers 34A to 34N

Figure 9:
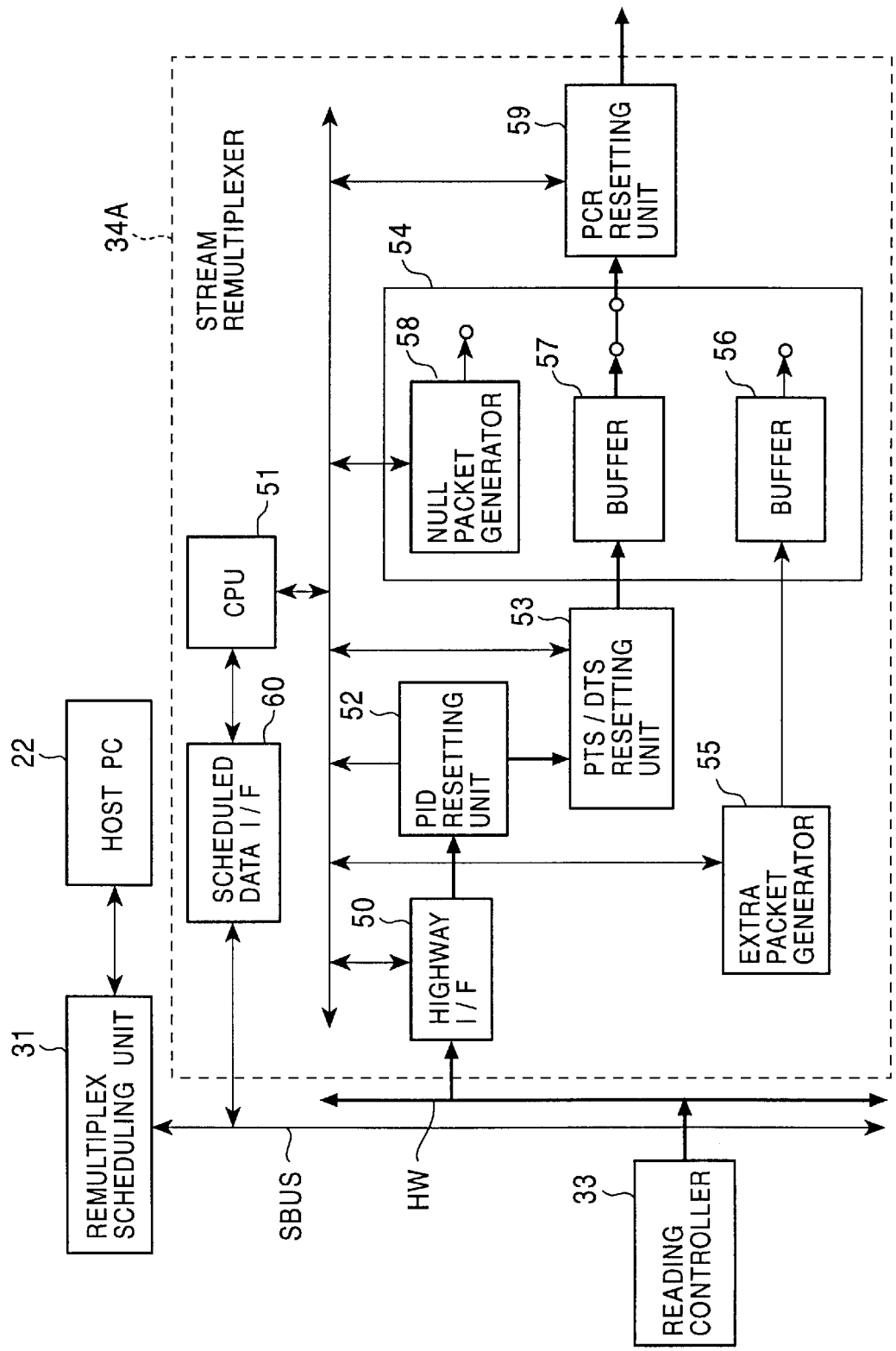
FIG. 9 is a detailed block diagram showing a stream remultiplexer.

FIG. 9 shows a detailed block diagram of a stream remultiplexer 34A. Other stream remultiplexers 34B to 34N have the same structure as the stream remultiplexer 34A, and treat different streams. Accordingly, a repetition of the description thereof will be omitted.

In the stream remultiplexer 34A, under the control of a CPU 51 in accordance with the scheduled data, a highway I/F 50 captures a transport stream assigned to the stream remultiplexer 34A from among the transport streams transmitted from the reading controller 33 to the stream highway HW. The captured transport stream data is output to a PID resetting unit 52.

The PID resetting unit 52 outputs to a PTS/DTS resetting unit 53 transport stream data output from the highway I/F 50. At this time, the PID resetting unit 52 is controlled by the CPU 51 to reset and output the PID in accordance with the scheduled data.

The PTS/DTS resetting unit 53 outputs to a multiplexer 54 the transport stream data output from the PID resetting unit 52. In the case where the packet data of the transport stream includes a PTS or DTS, the PTS/DTS resetting unit 53 is controlled by the CPU 51 to reset the PTS or DTS in accordance with the scheduled data. Then, the PTS/DTS resetting unit 53 sets as an offset value a difference value obtained by comparing an initial value described in the scheduled data and a first PTS or DTS appearing in the packet data of the transport stream.

An extra packet generator 55 is controlled by the CPU 51 to generate and output extra-information packet data in accordance with extra information described in the scheduled data.

In the multiplexer 54, a buffer 56 temporarily holds and outputs the extra-information packet data output from the extra packet generator 55. A buffer 57 temporarily holds the transport stream data output from the PTS/DTS resetting unit 53, and compresses it on a time base before outputting it.

A null packet generator 58 generates and outputs null packet data. The multiplexer 54 is controlled by the CPU 54 to selectively output the data output from the buffers 56 and 57, and the null packet generator 58. Thereby, the stream remultiplexer 34A multiplexes the transport streams in accordance with the scheduled data.

A program clock reference (PCR) resetting unit 59 outputs to an output I/F 35A (shown in FIG. 2) the multiplexed data output from the multiplexer 54. At this time, under the control of the CPU 51, the PCR resetting unit 59 sets a PCR initial value in a built-in counter before sequentially counting PCRs from the set value, and sets the counted value in each packet before outputting it.

A scheduled data I/F 60 receives the scheduled data output from the remultiplex scheduling unit 31 via the data bus SBUS, and outputs them to the CPU 51.

Figure 10:
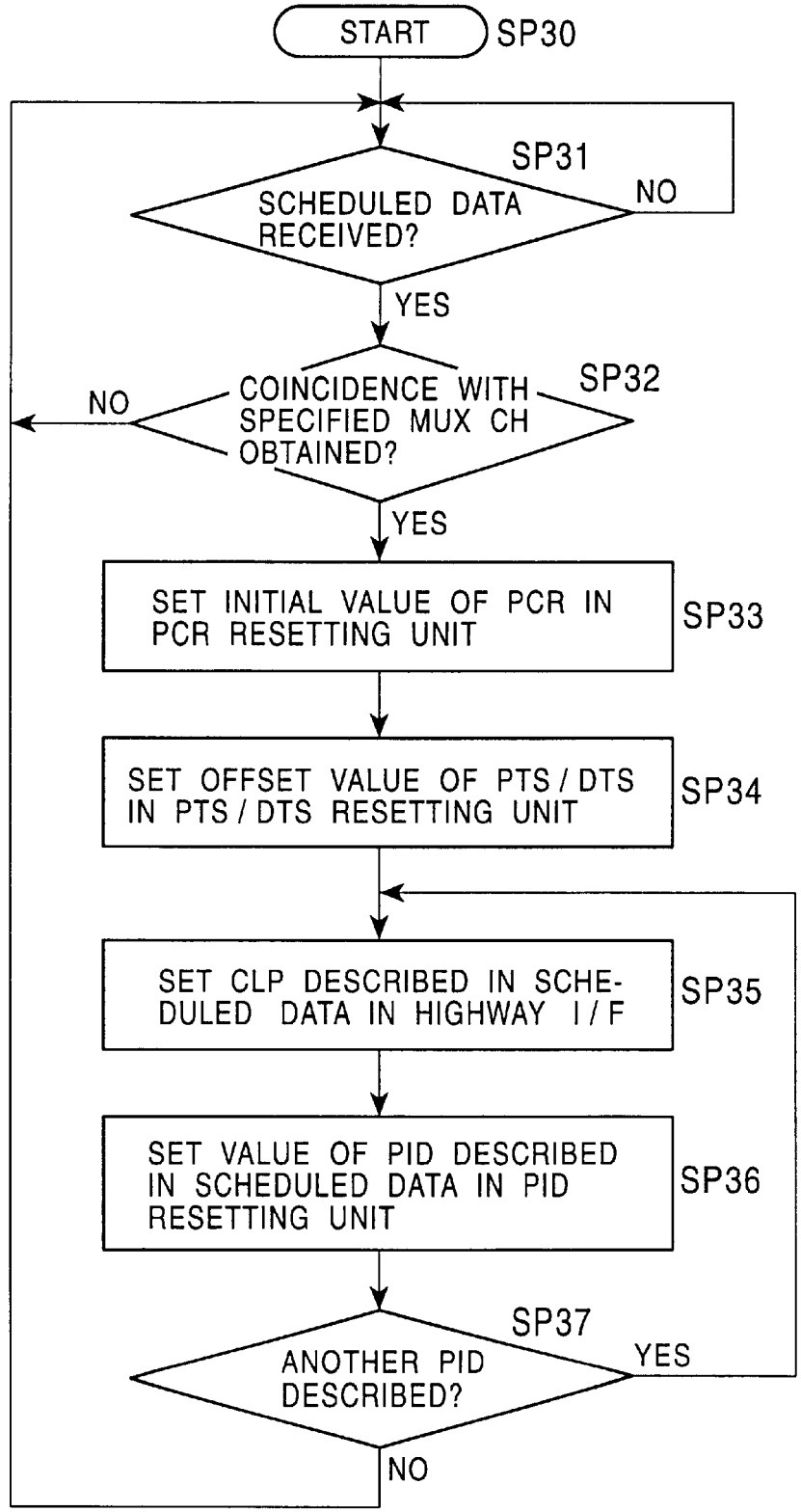
FIG. 10 is a flowchart showing a process performed in a central processing unit in a stream remultiplexer.
Figure 11:
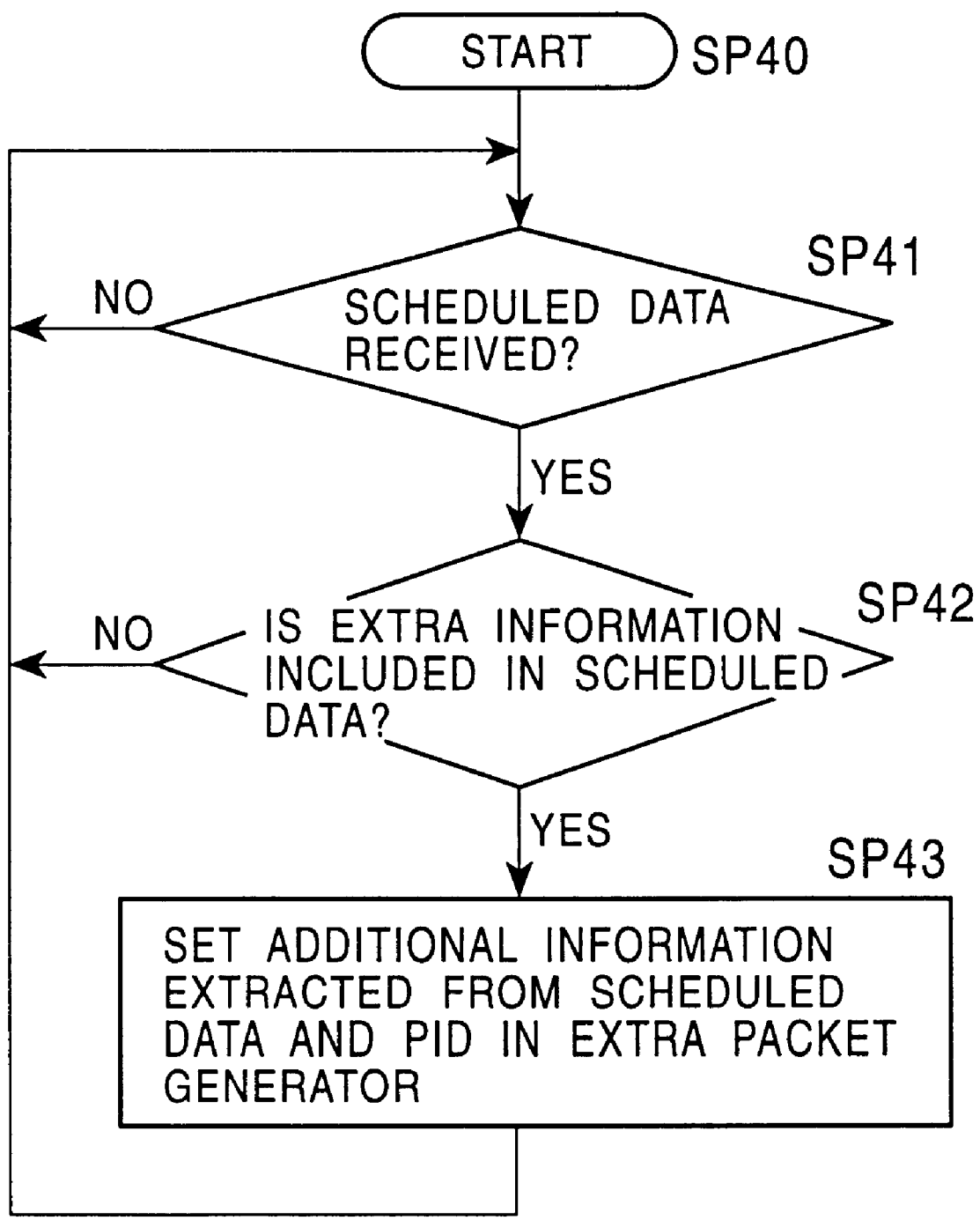
FIG. 11 is a flowchart showing a process executed by a central processing unit in a stream remultiplexer in parallel to the process shown in FIG. 10.
Figure 12:
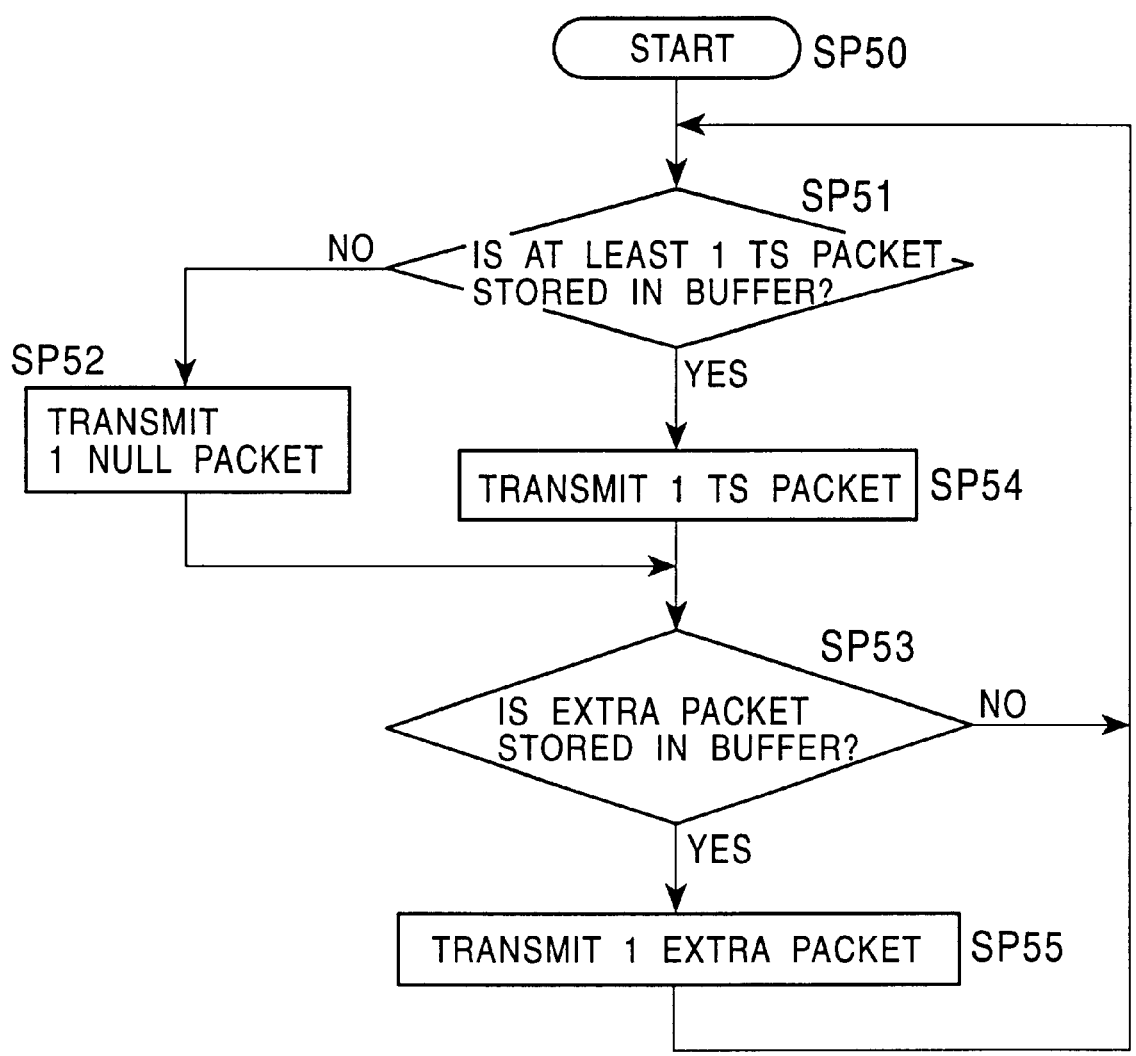
FIG. 12 is a flowchart showing a process performed a central processing unit in a stream remultiplexer in parallel to the processes shown in FIGS. 11 and 12.

The CPU 51 functions as a controller for controlling the operation of the stream remultiplexer 34A, and executes in parallel the processes shown in FIGS. 10 to 12, whereby setting the operation of each component block, and multiplexing the transport streams based on the set conditions to generate multiplexed data. The process shown in FIG. 10 is used to control the highway I/F 50, the PID resetting unit 52, the PTS/DTS resetting unit 53, and the PCR resetting unit 59. The process shown in FIG. 11 is used to control the extra packet generator 55. The process shown in FIG. 12 is used to control the multiplexer 54.

In the process shown in FIG. 10, the CPU 51 starts processing in step SP30, and proceeds to step SP31, in which it determines whether scheduled data has already been received. If the CPU 51 has determined negatively, it repeatedly performs step SP31, whereby remaining on standby until scheduled data is received.

If the scheduled data has been received, the CPU 51 proceeds to step SP32, in which it determines whether the multiplex channel MUX CH described in the scheduled data is coincident with a channel assigned to the stream remultiplexer 34A. In the case where the CPU 51 determines negatively in step SP32, the other stream remultiplexers 34B to 34N perform multiplexing, and the CPU 51 returns to step SP31.

Conversely, if, in step SP32, the CPU 51 determines affirmatively, it proceeds to step SP33, in which it uses the received scheduled data to detect a PCR initial value, and sets it in the PCR resetting unit 59. Thereby, the CPU 51 uses the PCR resetting unit 59 to successively set PCRs in accordance with the scheduled data.

In step SP34, the CPU 51 sets the PTS/DTS offset value in the PTS/DTS resetting unit 53, based on the received scheduled data. Accordingly, the CPU 51 can reset a PTS or DTS based on the received scheduled data, using PTS/DTS resetting unit 53.

In step SP35, the CPU 51 sets, in the highway I/F 50, variable CLP described in the received scheduled data, whereby a clip based on the variable CLP can selectively be captured.

In step SP36, the CPU 51 sets, in the PID resetting unit 52, the value of the PID described in the received scheduled data, whereby a PID can be reset in accordance with the scheduled data for the TS packet of the corresponding clip.

When the CPU 51 sets the operation of the PCR resetting unit 59, etc., for one CLP described in scheduled data, the CPU 51 proceeds to step SP37, in which it determines whether another CLP is described in the received scheduled data, whereby determining whether the setting of the PID resetting unit 52, etc., for all CLPs described in the received scheduled data is complete. If the CPU 51 has determined affirmatively, the CPU 51 proceeds back to step SP35, in which it performs the setting of the PID resetting unit 52, etc., for the remaining CLPs. Conversely, if the CPU 51 has determined negatively, it returns to step SP31.

In the process shown in FIG. 11, the CPU 51 starts processing in step SP40. In step SP41, the CPU 51 determines whether scheduled data is received. If the CPU 51 has determined negatively, it repeatedly performs step SP41, and remains on standby until the scheduled data is received.

When the scheduled data is received, the CPU 51 proceeds to step SP42, in which it determines whether extra information is described in the received scheduled data. If the CPU 51 has determined negatively, the CPU 51 proceeds to step SP41, in which it remains on standby until successive scheduled data is received.

If, in step SP42, the CPU 51 has determined affirmatively, it proceeds to step SP43. In step SP43, the CPU 51 extracts from the received scheduled data, extra information, CLP information, and reset PID information, and sets them in the extra packet generator 55. Accordingly, the CPU 51 performs setting for generating extra packets based on the extra information in accordance with the scheduled data, and returns to step SP41.

In the process shown in FIG. 12, the CPU 51 starts processing in step SP50, and proceeds to step SP51, in which it determines whether at least one TS packet is stored in the buffer 57. If the CPU 51 has determined negatively, it proceeds to step SP52, in which it instructs the multiplexer 54 to transfer the null packet generated by the null packet generator 58 before proceeding to step SP53. If, in step SP51, the CPU 51 has determined affirmatively, it proceeds to step SP54, in which it instructs the multiplexer 54 to transfer the TS packets stored in the buffer 57 before proceeding to step SP53.

In step SP53, the CPU 51 determines whether an extra packet is stored in the buffer 57. If the CPU 51 has determined affirmatively, it proceeds to step SP55, in which it instructs the multiplexer 54 to transfer the extra packet before returning to step SP51. If, in step SP53, the CPU 51 has determined negatively, it returns directly to step SP51.

Figure 13:
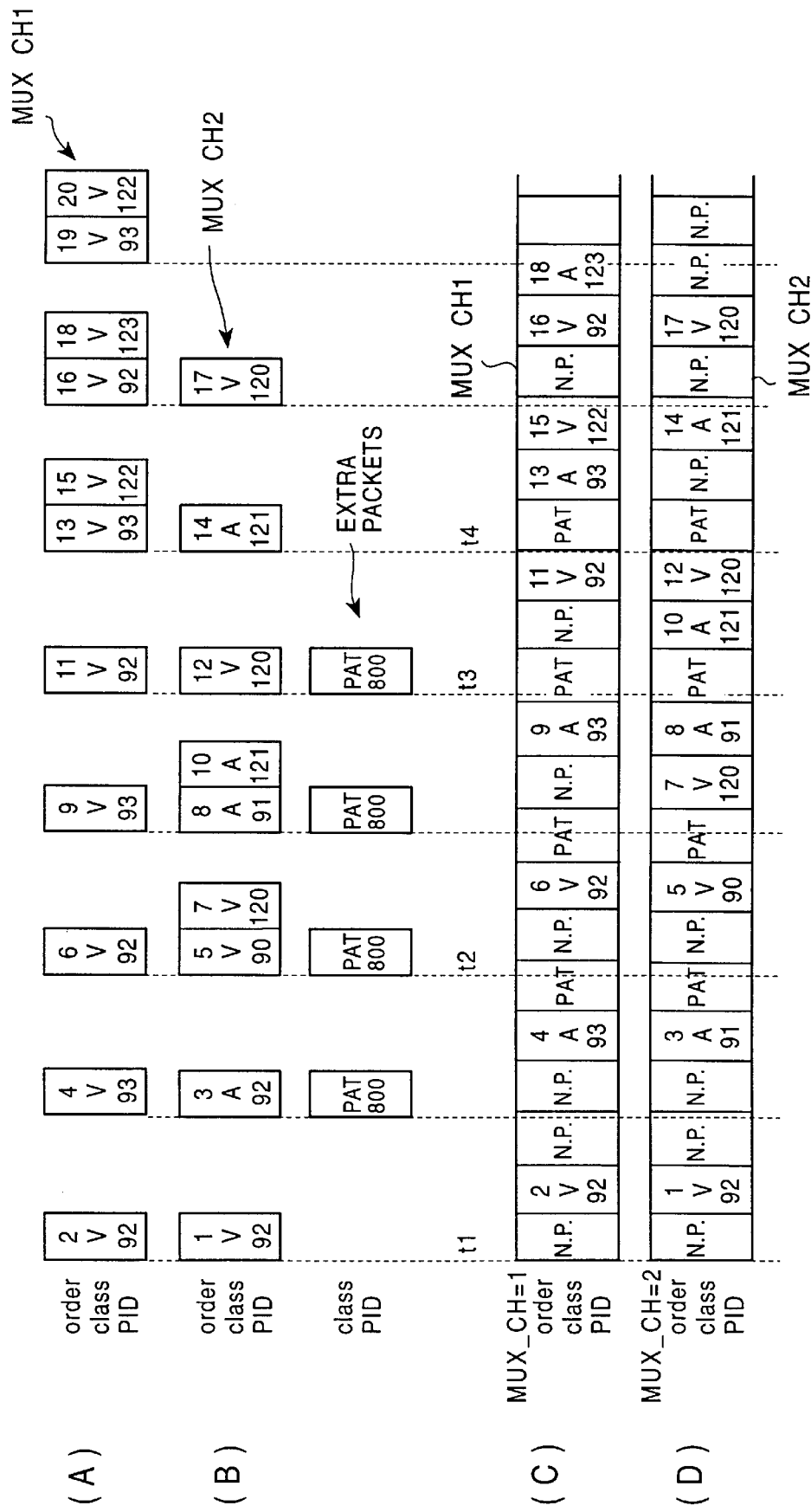
FIG. 13 is a time chart illustrating multiplexing executed by the processes shown in FIGS. 10 to 12.

Accordingly, as shown in parts (A) and (B) of FIG. 13, stream remultiplexers, respectively assigned to multiplex channels MUX CH1 and MUX CH2, capture the corresponding TS packets, and generate extra packets. Null packets are inserted among the TS packets and the extra packets, whereby time-divisional multiplexed streams can be generated as shown in parts (C) and (D) of FIG. 13.

(2) Operation of First Embodiment

In the digital transmission system 20 (shown in FIG. 1) having the above-described structure, transport streams based on MPEG2 are output from the encoder 2, and are stored in the RAID 32 in units of packets. Accordingly, clips to be transmitted by the digital transmission system 20 are stored in the RAID 32 as shown in FIG. 2.

Together with this operation, the host PC 22 issues a transmission request in which the time of transferring each clip, extra information, etc., are described (as shown in FIG. 3). The remultiplex scheduling unit 31 (shown in FIG. 2) generates scheduled data (shown in FIG. 4) for sequentially instructing the reading, multiplexing, and outputting of clips. Therefore, in the digital transmission system 20, the scheduled data are used for unified control of the reading of the clips stored in the RAID 32, the multiplexing of the read clips, and the outputting of the multiplexed clips, whereby a load on the host PC 22 is reduced.

Accordingly, at a point of time described in the scheduled data when the above-described preliminary processing is complete, the corresponding scheduled data is output from the remultiplex scheduling unit 31 to the scheduled data bus SBUS.

In the reading controller 33, the SCSI controllers 37A to 37M access the RAID 23, based on the scheduled data. The transport stream of the clip to be transferred is sequentially read in units of packets, and the read packets are transmitted to the stream highway HW (shown in FIGS. 5 to 8).

The TS packets transmitted to the stream highway HW are captured based on the scheduled data into the stream remultiplexers 34A to 34N (as shown in FIG. 9). The stream remultiplexers 34A to 34N perform time-divisional multiplexing to transform the captured TS packets, together with extra packets and null packets, into multiplexed streams TTSA to TTSN. The multiplexed streams TTSA to TTSN are processed using digital modulation and frequency multiplexing before being transferred. At this time, based on the scheduled data, the PID, the PTS, the DTS, the PCR, etc., are reset before being transferred.

As shown in FIGS. 14A and 14B, in the digital transmission system 20, packets read from the RAID 32 are directly multiplexed to form streams to be transmitted. Conversely, in the digital transmission system shown in FIG. 15, when TS packets are output from a server 3, they are multiplexed to form transport streams. A multiplexer 5 decomposes the transport streams into packets, and subsequently, multiplexing with other transport streams is performed to form streams to be transmitted. Accordingly, compared with a system composed of conventional multipurpose apparatuses, the entire system structure is simplified.

(3) Effects of First Embodiment

The digital transmission system 20 having the above-described structure generates scheduled data used for sequentially instructing the reading, multiplexing, and outputting of clips, and uses the scheduled data to execute the reading of clips stored in the RAID 32, the multiplexing of the read clips, and the outputting of multiplexed streams. This enables unified control of component blocks, whereby a load on the host PC 22 can be reduced.

In addition, by directly multiplexing read TS packets, between corresponding packets, a system structure, which is simplified as a whole, can be formed.

(4) Other Embodiments

In the first embodiment, an example in which clips are read in units of TS packets for being processed has been described. However, the present invention is not limited to this example, but clips may be read in units of a plurality of packets. This can increase the server's capability of transmitting streams. For this purpose, it is required that buffers should be positioned on the side of the stream remultiplexers 34A to 34N, or control of the buffer 57 should be switched so that time-base multiplexing is performed using one TS packet as a unit. Instead, time-divisional multiplexing before transmission may be performed using a plurality of packets as a unit.

In the first embodiment, an example in which clips are stored in the RAID 32 has been described. However, the present invention is not limited to this example, but various data storage means such as ordinary hard disk drives may be used.

In the first embodiment, an example in which multiplexed streams in a plurality of channels are generated has been described. However, the present invention is not limited to this example, but may be applied to a case where one-channel multiplexed streams are generated. In this case, scheduled data are used to sequentially instruct the reading and multiplexing of clips.

In the first embodiment, an example in which transport streams based on MPEG2 are multiplexed and transmitted has been described. However, the present invention is not limited to this example, but may widely be applied to cases where transport streams based on a plurality of formats are multiplexed and transmitted.

In the first embodiment, transmission of multiplexed streams by using digital modulation based on 64 QAM has been described. However, the present invention is not limited to this type of transmission, but may widely be applied to transmission of multiplexed streams by using various digital modulation methods such as PSK.

In the first embodiment, transmission of frequency-multiplex RF signals via a coaxial cable has been described. However, the present invention is not limited to this type of transmission, but may widely be applied to various digital transmission systems and communication systems such as satellite broadcasting.

What is claimed is:

1. Data apparatus operable with a host computer, said apparatus comprising:

a schedule data bus;

a scheduler separate from said host computer for receiving request information from said host computer and in response thereto for generating scheduled data for instructing reading and multiplexing of data clips stored in a data store;

a reader for sequentially reading from said data store the stored clips in the form of transport stream packets corresponding to said scheduled data, said transport stream packets being allocated to a plurality of channels;

a multiplexer for time-divisionally multiplexing the transport stream packets output from said reader in accordance with said scheduled data, and without being separated into respective ones of said channels of transport stream packets; and a data transmitter for transmitting the time-division multiplexed transport stream packets output from said multiplexer, whereby said host computer is not directly coupled to said schedule data bus and whereby said scheduler, said reader, and said multiplexer are directly coupled to said schedule data bus so as to enable said scheduler to supply said scheduled data to said reader and said multiplexer.

2. Apparatus according to claim 1, wherein said scheduler updates said scheduled data in accordance with the request information that is input at a predetermined timing.

3. Apparatus according to claim 1, wherein said data transmitter includes a digital modulator for digitally modulating said multiplexed transport stream packets output from said multiplexer.

4. A data transmitting method comprising the steps of:

receiving request information from a host computer and in response thereto generating scheduled data by use of a scheduler for instructing reading and multiplexing of data clips stored in a data store, in which the scheduler is separate from said host computer;

sequentially reading by use of a reader from said data store the stored clips in the form of transport stream packets corresponding to said scheduled data, said transport stream packets being allocated to a plurality of channels;

time-divisionally multiplexing the read transport stream packets by use of a multiplexer in accordance with said scheduled data, without being separated into respective ones of said channels of transport stream packets; and transmitting the time-division multiplexed transport stream packets, whereby said host computer is not directly coupled to a schedule data bus and whereby said scheduler, said reader, and said multiplexer are directly coupled to said schedule data bus so as to enable said scheduler to supply said scheduled data to said reader and said multiplexer.

5. A method according to claim 4, wherein said scheduled data are updated in accordance with the request information that is input at a predetermined timing.

* * * * *